US011022701B2

(12) United States Patent
Azarkevich et al.

(10) Patent No.: US 11,022,701 B2
(45) Date of Patent: Jun. 1, 2021

(54) METHOD FOR DETERMINING A POSITION, CONTROL MODULE AND STORAGE MEDIUM

(71) Applicant: Continental Automotive GmbH, Hannover (DE)

(72) Inventors: Sergey Azarkevich, Regensburg (DE); Holger Faisst, Sinzing (DE)

(73) Assignee: Continental Automotive GmbH

( * ) Notice: Subject to any disclaimer, the term of this patent is extended or adjusted under 35 U.S.C. 154(b) by 224 days.

(21) Appl. No.: 16/311,927

(22) PCT Filed: Jun. 27, 2017

(86) PCT No.: PCT/DE2017/200058
§ 371 (c)(1),
(2) Date: Dec. 20, 2018

(87) PCT Pub. No.: WO2018/010739
PCT Pub. Date: Jan. 18, 2018

(65) Prior Publication Data
US 2019/0219710 A1  Jul. 18, 2019

(30) Foreign Application Priority Data

Jul. 14, 2016  (DE) ............... 10 2016 212 919.8

(51) Int. Cl.
*G01S 19/42* (2010.01)
*G01S 19/25* (2010.01)
*G01S 19/29* (2010.01)
*G01S 19/52* (2010.01)

(52) U.S. Cl.
CPC ............ *G01S 19/42* (2013.01); *G01S 19/256* (2013.01); *G01S 19/258* (2013.01); *G01S 19/29* (2013.01); *G01S 19/52* (2013.01)

(58) Field of Classification Search
CPC .................................. G01S 19/24; G01S 19/40
USPC ....................................................... 342/357.78
See application file for complete search history.

(56) References Cited

U.S. PATENT DOCUMENTS 5,897,605 A * 4/1999 Kohli ...................... G01S 19/29
342/457
6,041,280 A * 3/2000 Kohli ...................... G01S 19/29
342/357.3
6,297,770 B1 * 10/2001 Ueda ..................... G01S 19/258
342/357.62

(Continued)

FOREIGN PATENT DOCUMENTS

EP      0167683 A1   1/1986
JP   2011-163817 A  * 8/2011 ............ G01S 19/52

OTHER PUBLICATIONS

B. Levitan et al., "GPS Systems: Technology, Operation, and Applications"; third edition; pp. 47-50; DiscoverNet Publishing; Cary, NC, USA; ISBN 978-193281319-7; copyright in the years 2009-2016. (Year: 2016).*

(Continued)

*Primary Examiner* — Bernarr E Gregory
(74) *Attorney, Agent, or Firm* — RatnerPrestia

(57) ABSTRACT

A method for determining a position of a unit by satellite navigation, wherein the position is determined solely by Doppler measurements. Further, an associated control module and an associated data storage medium are disclosed.

13 Claims, 1 Drawing Sheet

(56) References Cited

U.S. PATENT DOCUMENTS

| | | | |
|---|---|---|---|
| 6,483,457 B2* | 11/2002 | Hirata | G01S 19/258 342/357.62 |
| 7,133,772 B2* | 11/2006 | van Diggelen | G01S 19/42 701/469 |
| 7,269,512 B2* | 9/2007 | Mori | G01S 19/42 701/469 |
| 7,567,208 B2* | 7/2009 | Mo | G01S 19/42 342/357.25 |
| 8,125,378 B1* | 2/2012 | Jarpenvaa | G01S 19/40 342/357.46 |
| 8,190,365 B2* | 5/2012 | Chansarkar | G01S 19/42 701/469 |
| 2002/0163467 A1* | 11/2002 | Martikka | G01S 19/40 342/357.23 |
| 2003/0090413 A1* | 5/2003 | Syrjarinne | G01S 19/256 342/357.65 |
| 2003/0162552 A1 | 8/2003 | Lehtinen | |
| 2005/0116860 A1* | 6/2005 | Kishimoto | G01S 19/24 342/357.63 |
| 2006/0111840 A1 | 5/2006 | van Diggelen | |
| 2006/0229805 A1 | 10/2006 | van Diggelen | |
| 2008/0018531 A1* | 1/2008 | Matsumoto | G01S 19/29 342/357.68 |
| 2009/0119015 A1 | 5/2009 | Chansarkar et al. | |
| 2012/0293366 A1 | 11/2012 | Liu et al. | |

OTHER PUBLICATIONS

German Search Report for German Application No. 10 2016 212 919.8, dated Jun. 30, 2017, with partial translation—11 pages.

International Search Report and Written Opinion for Application No. PCT/DE2017/200058, dated Oct. 17, 2017—10 pages.

Lehtinen, A., "Doppler Positioning with GPS", Master of Science Thesis, Tampere University of Technology, Mar. 2002—70 pages.

Progri et al., "A Doppler Based Navigation Algorithm", Proceedings of the 2001 National Technical Meeting of The Institute of Navigation, Long Beach, CA, Jan. 2001—pp. 482-490.

Chen et al., "A New Coarse-Time GPS Positioning Algorithm Using Combined Doppler and Code-Phase Measurements", Conference on Outdoor Advertising Research, Springer, Zurich, vol. 18, No. 4, Oct. 31, 2013—pp. 541-551.

\* cited by examiner

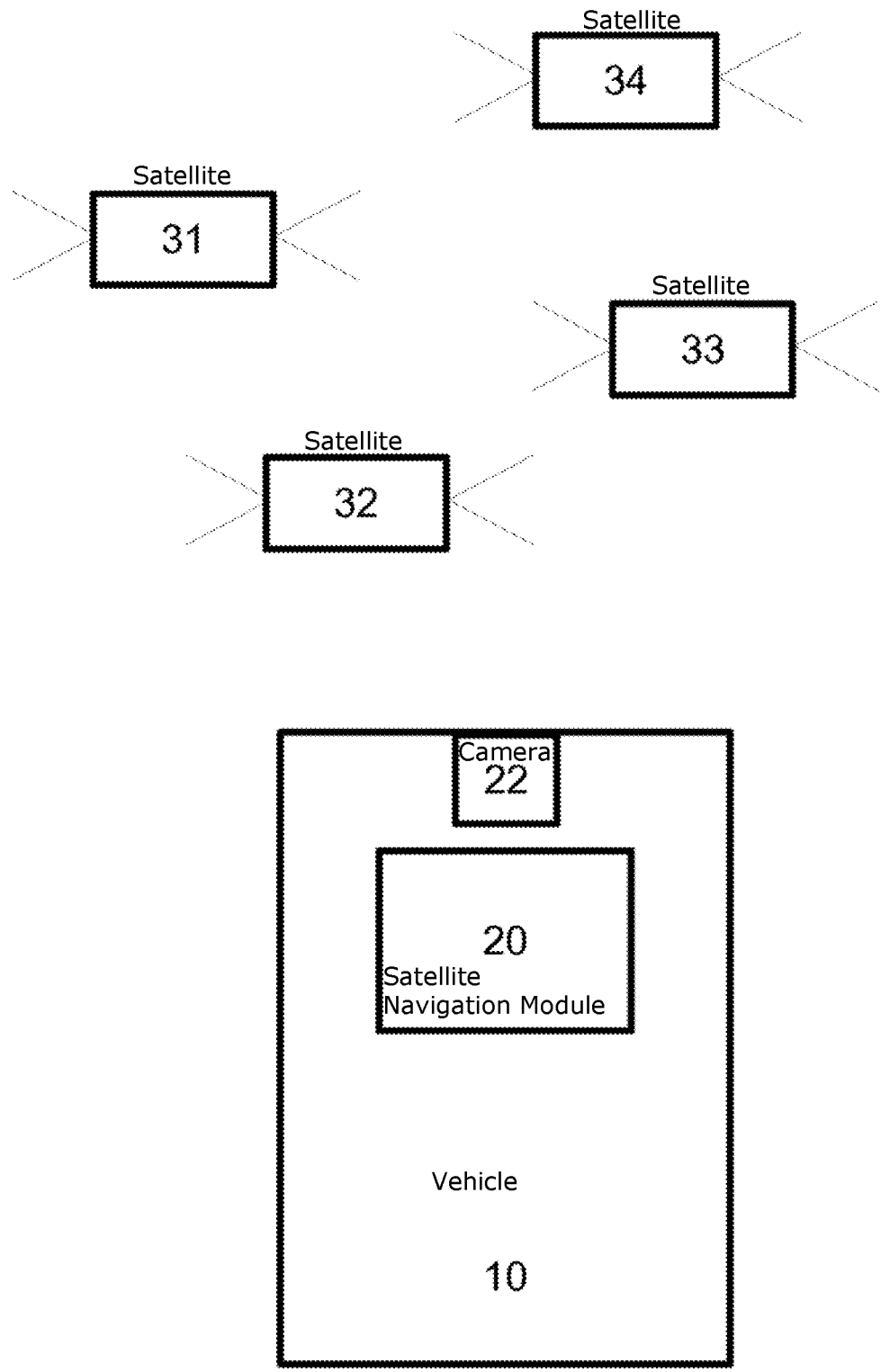

METHOD FOR DETERMINING A POSITION, CONTROL MODULE AND STORAGE MEDIUM

CROSS REFERENCE TO RELATED APPLICATIONS

This application is the U.S. National Phase Application No. PCT International Application No. PCT/DE2017/200058, filed Jun. 27, 2017, which claims priority to German Patent Application No. 10 2016 212 919.8, filed Jul. 14, 2016, the contents of such applications being incorporated by reference herein.

FIELD OF THE INVENTION

The invention relates to a method for determining a position of a unit, in particular a vehicle. Further, the invention relates to an associated control module and an associated data storage medium.

BACKGROUND OF THE INVENTION

Determining an accurate position on the Earth's surface is becoming ever more important for vehicles. Vehicle-to-X communication and autonomous driving are mentioned as examples, with such cases typically not only still requiring an approximate location of the vehicle like for navigation purposes but also an accurate localization of the vehicle on the road, i.e., for example, an assignment to a specific lane.

According to the prior art, the position of a vehicle is typically determined by means of satellite navigation, with the procedure known as single-point positioning (SPP) being applied in the process. Based on a time-of-flight measurement, following formula (1) is used in this case:

$$\rho^m = \sqrt{(x-x^m)^2+(y-y^m)^2+(z-z^m)^2}+c\delta t_r \quad (1)$$

In this case:
m is an index of a respective satellite,
$\rho^m$ is a time-of-flight value or a value calculated from a time-of-flight value,
x, y, z are components of the vector position of the unit or of the vehicle,
$x^m, y^m, z^m$ are components of the vector position of the satellite with index m,
c is the speed of light, and
$\delta t_r$ is a clock error of the unit.

Typically, four measurements on the basis of four satellites are required for determining the position in this way.

If a velocity should be determined, too, it is possible to resort to a method which is known as single-point velocity (SPV) and which is based on Doppler measurements. In particular, following formula (2) is used in this case:

$$\dot{\rho}^m = \frac{[(x-x^m)(y-y^m)(z-z^m)]}{\sqrt{(x-x^m)^2+(y-y^m)^2+(z-z^m)^2}} \begin{bmatrix} (v_x - v_x^m) \\ (v_y - v_y^m) \\ (v_z - v_z^m) \end{bmatrix} + c\delta \dot{t}_r \quad (2)$$

In this case:
m is an index of a respective satellite,
$\dot{\rho}^m$ is a Doppler value or a value calculated from a Doppler value,
x, y, z are components of the vector position of the unit,
$x^m, y^m, z^m$ are components of the vector position of the satellite with index m,
$v_x, v_y, v_z$ are components of the velocity of the unit,
$v_x^m, v_y^m, v_z^m$ are components of the velocity of the satellite with index m,
c is the speed of light, and
$\delta \dot{t}_r$ is a derivative of a clock error of the unit.

Thus, in order to determine the velocity, use is made in this case of Doppler measurements which are based on the signals received from the satellites. However, this also includes the position of the unit that was established by means of SPP. In subsequent data fusion blocks, for example with data that are obtained from inertial sensors, the position established by means of SPP and the velocity established by means of SPV consequently cannot be considered to be uncorrelated. In particular, this is due to the fact that the SPV velocity depends on the SPP position, for example in relation to ionospheric errors or multipath effects. This limits the level of safety and the performance (in particular the accuracy and the availability of the output of the fusion filter).

SUMMARY OF THE INVENTION

An aspect of the invention is a method for determining a position of a unit which provides an improvement in comparison with methods known from the prior art. Furthermore, an aspect of the invention is a control module, in particular a satellite navigation module, which is configured to carry out such a method. Moreover, an aspect of the invention is a non-volatile, computer-readable data storage medium which contains program code, during the execution of which a processor carries out such a method.

According to an aspect of the invention, this is achieved by a method, a control module, and a data storage medium. Advantageous configurations can be taken from the respective dependent claims, for example. The content of the claims is incorporated in the content of the description by express reference.

An aspect of the invention relates to a method for determining a position of a unit by means of satellite navigation. In particular, the unit can be a vehicle or a motor vehicle. The method includes the following steps:
receiving a plurality of satellite signals, namely at least
 a first satellite signal,
 a second satellite signal,
 a third satellite signal, and
 a fourth satellite signal,
performing a plurality of Doppler measurements on the satellite signals, in the process producing
 a first Doppler value on the basis of the first satellite signal,
 a second Doppler value on the basis of the second satellite signal,
 a third Doppler value on the basis of the third satellite signal, and
 a fourth Doppler value on the basis of the fourth satellite signal,
calculating the position on the basis of the first Doppler value, the second Doppler value, the third Doppler value and the fourth Doppler value, wherein the position is a variable of the calculation.

The method is based on the discovery of the inventors of the present application that time-of-flight measurements need not necessarily be used for the purposes of determining the position of a vehicle; instead, Doppler measurements are sufficient. Below, further explanations and examples are provided in relation to precisely how this can work. This is connected to a fundamental departure from methods known from the prior art when performing satellite navigation since, as a matter of principle, the position is initially determined on the basis of time-of-flight measurements in methods according to the prior art.

In the method according to an aspect of the invention, the position can be determined precisely independently of time-of-flight measurements, and so the above-described problems with the correlation between position and velocity and the error propagation do not occur.

Preferably, all satellite signals are received by different satellites in each case. In particular, this means that each satellite signal is assigned to a respective satellite and that no other satellite signal is assigned to this satellite. This can increase the accuracy.

In particular, the position is calculated independently of time-of-flight measurements. In particular, this can mean that no position determined from time-of-flight measurements is included in the calculation.

According to a development, further, a derivative of a clock error of the unit is calculated during the calculation step on the basis of the Doppler values used for calculating the position, wherein the derivative of a clock error is a variable of the calculation. Hence, it is also still possible to calculate a derivative of the clock error in addition to the position, said derivative of the clock error possibly being required for other calculation steps or other applications, for example.

According to one embodiment, the method is carried out when the unit is stationary on the Earth's surface. Here, whether the unit is stationary can be identified by means of odometry, for example, in particular by means of a camera or else by other sensor systems, for example by wheel rotational speed sensors, radar sensors or inertial sensors (IMUs). Combinations thereof are also possible.

In the case of a unit that is stationary on the Earth's surface, no velocities, in particular, are required as variables in the calculation as these can be assumed to be zero. This simplifies the calculation and may reduce the number of satellites required to perform the method.

It is understood that the embodiments for a unit that is stationary on the Earth's surface and for a moving unit, as described herein, can also be combined with one another, in particular, and so both embodiments are implemented in a control module or software, for example. Here, different embodiments can be carried out depending on whether or not the unit is currently in motion.

Further, according to one embodiment, during the reception step
a fifth satellite signal,
a sixth satellite signal, and
a seventh satellite signal
are received.

Here, further, during the step of performing a plurality of Doppler measurements,
a fifth Doppler value is produced on the basis of the fifth satellite signal,
a sixth Doppler value is produced on the basis of the sixth satellite signal, and
a seventh Doppler value is produced on the basis of the seventh satellite signal.

Here, during the calculation step, the position is also calculated on the basis of the fifth Doppler value, the sixth Doppler value and the seventh Doppler value, wherein the position and components of the velocity vector of the unit are variables of the calculation.

Thus, seven satellites or seven satellite signals are used precisely in this case such that the position according to the method according to an aspect of the invention can be calculated in the general case of a unit moving on the Earth's surface, in which the three vector components of the velocity vector of the unit on the Earth's surface are variables of the calculation.

Typically, the Doppler values are values which indicate a velocity that was established on the basis of Doppler measurements.

It is understood that, typically, four satellites or four satellite signals are sufficient in the case of a vehicle that is stationary on the Earth's surface.

According to one embodiment, the method is carried out in the case of a unit moving on the Earth's surface. By way of example, this can be implemented as just described above.

By way of example, the position can be calculated on the basis of the following formula:

$$\dot{\rho}^m = \frac{[(x-x^m)(y-y^m)(z-z^m)]}{\sqrt{(x-x^m)^2+(y-y^m)^2+(z-z^m)^2}} \begin{bmatrix} (v_x - v_x^m) \\ (v_y - v_y^m) \\ (v_z - v_z^m) \end{bmatrix} + c\dot{\delta t_r} \quad (2)$$

or a linearization thereof, where
m is an index of a respective satellite,
$\dot{\rho}^m$ is a Doppler value or a value calculated from a Doppler value,
x, y, z are components of the vector position of the unit,
$x^m$, $y^m$, $z^m$ are components of the vector position of the satellite with index m,
$v_x$, $v_y$, $v_z$ are components of the velocity of the unit,
$v_x^m$, $v_y^m$, $v_z^m$ are components of the velocity of the satellite with index m,
c is the speed of light, and
$\dot{\delta t_r}$ is a derivative of a clock error of the unit.

Consequently, it is possible to resort to the known formula in this case, said formula, however, being used in the form where position and velocity are based not on time-of-flight measurements but rather on Doppler measurements.

It is understood that, in the case of a unit that is stationary on the Earth's surface, the components of the velocity, i.e. $v_x$, $v_y$, $v_z$, in particular, can each be set to zero in this formula.

According to a development, further, a further satellite navigation signal is received during the reception step, and the method further includes the following steps:
performing a time-of-flight measurement on the basis of the further satellite navigation signal, producing a time-of-flight value in the process, and
calculating a clock error of the unit on the basis of the position and the time-of-flight value.

Hence, the method can also be used to calculate the clock error, which may be required for other applications, for example.

In particular, the clock error can be calculated on the basis of the following formula:

$$\rho^m = \sqrt{(x-x^m)^2+(y-y^m)^2+(z-z^m)^2} + c\delta t_r \quad (1)$$

or a linearization thereof, where
m is an index of a respective satellite,
$\rho^m$ is a time-of-flight value or a value calculated from a time-of-flight value,
x, y, z are components of the vector position of the unit,
$x^m$, $y^m$, $z^m$ are components of the vector position of the satellite with index m,
c is the speed of light, and
$\delta t_r$ is a clock error of the unit.

Thus, in this case, too, it is possible to resort to the known formula.

Preferably, the method is carried out using a terrestrially centered and terrestrially fixed coordinate system. This means that a unit that is stationary on the Earth's surface has a velocity of zero. The positions and velocities of the satellites are preferably also specified in this coordinate system, with these positions and velocities typically being known or being transmitted via various almanac data and ephemeris data to satellite navigation modules or other units that utilize satellite signals.

In particular, the unit can be a motor vehicle. However, in principle, the method is also applicable in other units such as, for example, a cellular telephone, a portable satellite navigation appliance, a watercraft or an aircraft.

An aspect of the invention further relates to a control module, in particular a satellite navigation module, which is configured to carry out a method according to an aspect of the invention. Moreover, an aspect of the invention relates to a non-volatile, computer-readable data storage medium which contains program code, during the execution of which a processor carries out a method according to an aspect of the invention. In respect of the method according to an aspect of the invention, reference can be made, in principle, to all of the described embodiments and variants.

Below, certain aspects or concepts of the invention are described separately, wherein, in principle, the aspects and concepts mentioned below can be combined amongst themselves and also with all other disclosures of this application in any desired way. However, they can also be independent aspects of the invention.

According to a first concept, a position of the unit or an antenna position can be implemented purely on the basis of Doppler measurements.

At rest, i.e., if $v_x=0$, $v_y=0$, $v_z=0$ applies, which may be identified, in particular, by odometry or other sensor systems, the position solution x, y, z, $\delta t_r$ can be obtained by the aforementioned equation (2) or a linearization thereof, wherein, typically, use can be made of at least four Doppler measurements.

In general situations, i.e., if $v_x \neq 0$, $v_y \neq 0$, $v_z \neq 0$ applies or is at least to be expected, the position solution (and velocity solution) x, y, z, $v_x$, $v_y$, $v_z$, $\delta t_r$ can be obtained by the aforementioned equation (2) or a linearization thereof. Here, typically, use can be made of at least seven Doppler measurements.

According to a further concept, the position can be obtained on the basis of a mixture of time-of-flight measurement and Doppler measurements.

At rest, i.e., if $v_x=0$, $v_y=0$, $v_z=0$ applies, which may be identified, in particular, by odometry and/or other sensor systems, the position solution x, y, z, $\delta t_r$, $\delta \dot{t}_r$ can be obtained by the aforementioned equations (1) and (2) or a respective linearization thereof, typically using at least five measurements. Here, the measurements are both time-of-flight measurements and Doppler measurements.

In the general case, i.e., if $v_x \neq 0$, $v_y \neq 0$, $v_z \neq 0$ applies, the position solution (and velocity solution) x, y, z, $v_x$, $v_y$, $v_z$, $\delta t_r$, $\delta \dot{t}_r$ can be obtained by means of equations (1) and (2) or a linearization thereof, typically using at least eight measurements. Once again, the measurements are both time-of-flight measurements and Doppler measurements.

In particular, the following points can be specified as advantages of the method according to an aspect of the invention:

Doppler measurements are influenced less by ionospheric effects and multipath effects.

Independent solutions are provided both for the position and for the velocity, and so there is no cross-correlation between time-of-flight-based solutions and Doppler-based solutions, no error propagation and a higher accuracy in the case of data fusion.

It is possible to perform a check between SPP and SPV, which further increases the level of safety, in particular in the case of data fusion.

Fewer satellites are required to determine the position if the unit or the vehicle is stationary.

BRIEF DESCRIPTION OF THE DRAWINGS

Further features and advantages will be gathered by a person skilled in the art from the exemplary embodiment described below with reference to the appended drawing in which:

The FIGURE shows an arrangement for performing the method according to an aspect of the invention.

DETAILED DESCRIPTION OF THE PREFERRED EMBODIMENTS

The FIGURE shows a vehicle 10, which is only illustrated schematically here. In principle, the vehicle 10 is embodied to move on the Earth's surface. However, this is not discussed in any more detail here.

The vehicle 10 comprises a satellite navigation module 20. This is an electronic control module which contains processor means and data storage means, wherein the data storage means store program code, during the execution of which the processor means carry out a method according to an aspect of the invention.

The vehicle 10 further comprises a camera 22, which is embodied to identify, by way of odometry, whether the vehicle 10 is currently at rest or in motion. Here, the Earth's surface, which can be seen by the camera 22, is the reference system.

Moreover, the FIGURE illustrates four satellites, namely a first satellite 31, a second satellite 32, a third satellite 33 and a fourth satellite 34. The satellites 31, 32, 33, 34 emit satellite signals, which are received by the vehicle 10 or the satellite navigation module 20 thereof.

Here, velocities and positions of the satellites 31, 32, 33, 34 are known to the satellite navigation module 20, in particular by way of transmitted ephemeris data and almanac data.

The FIGURE illustrates, by way of example, the situation in which the vehicle 10 is stationary and consequently four satellites suffice to determine the position according to the intended method. It is understood that typically seven satellites are used for determining the position according to the method according to an aspect of the invention in the general case.

Consequently, if the camera 22 identifies that the vehicle 10 is not moving on the Earth's surface, the satellite navigation module 20 thus establishes respective Doppler values from received satellite signals of the four satellites 31, 32, 33, 34 by way of Doppler measurements. Then, the Doppler values are used to determine the position of the vehicle 10 without the involvement of time-of-flight measurements. In particular, this can be implemented as described further above. Repetition is dispensed with here; rather, reference is made to the explanations made above.

Mentioned steps of the method according to an aspect of the invention can be executed in the indicated order. However, they can also be executed in a different order. In one of its embodiments, for example with a specific combination of steps, the method according to an aspect of the invention can be executed in such a way that no further steps are executed. However, in principle, further steps can also be executed, even steps of a kind which have not been mentioned.

The claims that are part of the application do not represent any dispensing with the attainment of further protection.

If it turns out in the course of the proceedings that a feature or a group of features is not absolutely necessary, then the applicant aspires right now to a wording for at least one independent claim that no longer has the feature or the group of features. This may be, by way of example, a subcombination of a claim present on the filing date or may be a subcombination of a claim present on the filing date that is limited by further features. Claims or combinations of features of this kind requiring rewording can be understood to be covered by the disclosure of this application as well.

It should further be pointed out that configurations, features and variants of aspects of the invention that are described in the various embodiments or exemplary embodiments and/or shown in the FIGURES can be combined with one another in any way. Single or multiple features can be interchanged with one another in any way. Combinations of features arising therefrom can be understood to be covered by the disclosure of this application as well.

Back-references in dependent claims are not intended to be understood as dispensing with the attainment of independent substantive protection for the features of the back-referenced dependent claims. These features can also be combined with other features in any way.

Features that are disclosed only in the description or features that are disclosed in the description or in a claim only in conjunction with other features may fundamentally be of independent significance essential to the invention. They can therefore also be individually included in claims for the purpose of distinction from the prior art.

The invention claimed is:

1. A method for determining a position of a unit by satellite navigation, the method comprising:
  receiving a plurality of satellite signals, including:
    a first satellite signal,
    a second satellite signal,
    a third satellite signal, and
    a fourth satellite signal;
  performing a plurality of Doppler measurements on the satellite signals, in the process producing:
    a first Doppler value on the basis of the first satellite signal,
    a second Doppler value on the basis of the second satellite signal,
    a third Doppler value on the basis of the third satellite signal, and
    a fourth Doppler value on the basis of the fourth satellite signal;
  calculating the position on the basis of the first Doppler value, the second Doppler value, the third Doppler value and the fourth Doppler value, wherein the position is calculated independently of time-of-flight measurements;
  receiving a further satellite navigation signal;
  performing a time-of-flight measurement on the basis of the further satellite navigation signal, producing a time-of-flight value in the process; and
  calculating a clock error of the unit on the basis of the position and the time-of-flight value.

2. The method as claimed in claim 1,
  wherein all satellite signals are received from different satellites in each case.

3. The method as claimed in claim 1,
  wherein, further, a derivative of a clock error of the unit is calculated during the calculation step on the basis of the Doppler values used for calculating the position, wherein the derivative of a clock error is a variable of the calculation.

4. The method as claimed in claim 1,
  which is carried out when the unit is stationary on the Earth's surface.

5. The method as claimed in claim 4,
  wherein the stationary state of the unit on the Earth's surface is identified by odometry.

6. The method as claimed in claim 1,
  wherein, further, during the reception step,
    a fifth satellite signal,
    a sixth satellite signal, and
    a seventh satellite signal
  are received,
  wherein, further, during the step of performing a plurality of Doppler measurements,
    a fifth Doppler value is produced on the basis of the fifth satellite signal,
    a sixth Doppler value is produced on the basis of the sixth satellite signal,
    a seventh Doppler value is produced on the basis of the seventh satellite signal, and
  wherein, during the calculation step, the position is also calculated on the basis of the fifth Doppler value, the sixth Doppler value and the seventh Doppler value, wherein the position and components of a velocity vector of the unit are variables of the calculation.

7. The method as claimed in claim 6,
  which is carried out when the unit is moving on the Earth's surface.

8. The method as claimed in claim 1,
  wherein the calculation of the position is performed on the basis of the following formula:

$$\dot{\rho}^m = \frac{[(x-x^m)(y-y^m)(z-z^m)]}{\sqrt{(x-x^m)^2+(y-y^m)^2+(z-z^m)^2}} \begin{bmatrix} (v_x - v_x^m) \\ (v_y - v_y^m) \\ (v_z - v_z^m) \end{bmatrix} + c\delta \dot{t}_r$$

or a linearization thereof,
where
m is an index of a respective satellite,
$\dot{\rho}^m$ is a Doppler value or a value calculated from a Doppler value,
x, y, z are components of the vector position of the unit,
$x^m$, $y^m$, $z^m$ are components of the vector position of the satellite with index m,
$v_x$, $v_y$, $v_z$ are components of the velocity of the unit,
$v_x^m$, $v_y^m$, $v_z^m$ are components of the velocity of the satellite with index m,
c is the speed of light, and
$\delta \dot{t}_r$ is a derivative of a clock error of the unit.

9. The method as claimed in claim 1,
  wherein the calculation of the clock error is performed on the basis of the following formula:

$$\rho^m = \sqrt{(x-x^m)^2+(y-y^m)^2+(z-z^m)^2} + c\delta t_r$$

or a linearization thereof, where m is an index of a respective satellite, $\rho^m$ is a time-of-flight value or a value calculated from a time-of-flight value, x, y, z are components of the vector position of the unit, $x^m$, $y^m$, $z^m$ are components of the vector position of the satellite with index m, c is the speed of light, and $\delta t_r$ is a clock error of the unit.

10. The method as claimed in claim 1, which is carried out using a terrestrially centered and terrestrially fixed coordinate system.

11. The method as claimed in claim 1, wherein the unit is a motor vehicle.

12. A satellite navigation control module comprising:
a receiver configured to receive a plurality of satellite signals, including:
   a first satellite signal,
   a second satellite signal,
   a third satellite signal, and
   a fourth satellite signal; and
a processor configured to:
   perform a plurality of Doppler measurements on the satellite signals, in the process producing:
      a first Doppler value on the basis of the first satellite signal,
      a second Doppler value on the basis of the second satellite signal,
      a third Doppler value on the basis of the third satellite signal, and
      a fourth Doppler value on the basis of the fourth satellite signal, and
   calculate the position on the basis of the first Doppler value, the second Doppler value, the third Doppler value and the fourth Doppler value, wherein the position is calculated independently of time-of-flight measurements, wherein the receiver is further configured to receive a further satellite navigation signal, and wherein the processor is further configured to:
   perform a time-of-flight measurement on the basis of the further satellite navigation signal, producing a time-of-flight value in the process, and
   calculate a clock error of the unit on the basis of the position and the time-of-flight value.

13. A non-volatile, non-transitory computer-readable data storage medium, containing computer programming code stored thereon, which, when executed, causes a processor to:
receive a plurality of satellite signals, including:
   a first satellite signal,
   a second satellite signal,
   a third satellite signal, and
   a fourth satellite signal;
perform a plurality of Doppler measurements on the satellite signals, in the process producing:
   a first Doppler value on the basis of the first satellite signal,
   a second Doppler value on the basis of the second satellite signal,
   a third Doppler value on the basis of the third satellite signal, and
   a fourth Doppler value on the basis of the fourth satellite signal;
calculate the position on the basis of the first Doppler value, the second Doppler value, the third Doppler value and the fourth Doppler value, wherein the position is calculated independently of time-of-flight measurements;
receive a further satellite navigation signal;
perform a time-of-flight measurement on the basis of the further satellite navigation signal, producing a time-of-flight value in the process; and
calculate a clock error of the unit on the basis of the position and the time-of-flight value.

\* \* \* \* \*